– –

United States Patent [19]

Smoot

[11] Patent Number: 4,890,893
[45] Date of Patent: Jan. 2, 1990

[54] DARK FIBER SWITCHED BANDWIDTH FILTER

[75] Inventor: Lanny S. Smoot, Morristown, N.J.

[73] Assignee: Bell Communications Research, Inc., Livingston, N.J.

[21] Appl. No.: 317,920

[22] Filed: Mar. 2, 1989

[51] Int. Cl.[4] .............................. G02B 6/28; H04B 9/00
[52] U.S. Cl. ............................... 350/96.15; 350/96.16; 455/610
[58] Field of Search .............. 350/96.15, 96.16; 370/1, 3; 455/601, 609, 610, 606, 612

[56] References Cited

U.S. PATENT DOCUMENTS

| | | | |
|---|---|---|---|
| 3,676,684 | 7/1972 | De Langue | 250/199 |
| 3,986,020 | 10/1976 | Kogelnik | 250/199 |
| 4,128,759 | 12/1978 | Hunt et al. | 250/199 |
| 4,145,110 | 3/1979 | Szentesi | 350/96.15 |
| 4,166,212 | 8/1979 | Judeinstein | 250/199 |
| 4,182,935 | 1/1980 | Chown | 179/15 |
| 4,341,438 | 7/1982 | Seki et al. | 350/96.16 |
| 4,441,181 | 4/1984 | Winzer et al. | 370/3 |
| 4,483,582 | 11/1984 | Sheem | 350/96.15 |
| 4,511,207 | 4/1985 | Newton et al. | 350/96.15 |
| 4,558,920 | 12/1985 | Newton et al. | 30/96.15 |
| 4,588,255 | 5/1986 | Tur et al. | 350/96.16 |
| 4,662,715 | 5/1987 | Shutterly | 350/96.16 |
| 4,681,395 | 7/1987 | Lindsay et al. | 350/96.16 |
| 4,696,063 | 9/1987 | Schembri | 455/612 |
| 4,702,550 | 10/1987 | Sano | 350/96.16 |
| 4,777,663 | 10/1988 | Charlton | 370/3 X |
| 4,804,248 | 2/1989 | Bhagavatula | 350/96.15 |
| 4,821,255 | 4/1989 | Kobrinski | 370/3 |

Primary Examiner—William L. Sikes
Assistant Examiner—Akm E. Ullah
Attorney, Agent, or Firm—James W. Falk

[57] ABSTRACT

A device for affecting an individual bit rate limitation for each of a plurality of wavelength channels propagating in an optical fiber is disclosed. In a particular embodiment, the device comprises a directional coupler which is inserted into the optical fiber link. A recirculation path for a fraction of the power propagating in the fiber link extends between an output of the coupler and an input of the coupler. Illustratively, the recirculation path includes a wavelength division demultiplexer and an individual delay element for each wavelength channel. Optical switches may be utilized to block or permit passage of individual wavelength channels in the recirculation path.

10 Claims, 4 Drawing Sheets

DARK FIBER SWITCHED BANDWIDTH FILTER

FIELD OF THE INVENTION

The present invention relates to a device for controlling the maximum bit rate of an optical fiber link used in an optical communications system. In accordance with the present invention, a device may be inserted into an optical fiber link to individually control the maximum bit rate of the various wavelengths channels transmitted therein.

BACKGROUND OF THE INVENTION

Telecommunications customers with a high volume of communications between specific sites have long used dedicated leased lines between those sites. Tariffs for those leased lines are based on the line' length and their maximum bit rate. The advent of optical telecommunications, based on laser sources and optical fiber cable, has been accompanied by similar leased-line service offerings. One popular option is called "dark fiber". In this service the communications company provides an optical fiber link, but none of the equipment at either end. The customer leasing the optical fiber link decides the nature of that equipment. Thus, the communications company supplying the optical fiber link knows the distance covered by the link. However, the communications company does not know the maximum bit rate being utilized by the customer.

In order to establish a maximum usable bit rate, and thus a rational basis for tariffing such optical fiber links, some device for limiting the maximum bit rate of such links would be useful. One such device is known as a bit-rate limiter (BRL). A BRL is composed of a four-port (2×2) directional coupler which is inserted into the optical fiber link. Illustratively, to insert the bit rate limiter, the fiber link is cut to form first and second cut ends. One cut end of the link is connected to the first input port of the coupler and the second cut end is connected to the first output port of the coupler. To provide a recirculation path, an optical fiber loop is connected between the second output port and the second input port of the coupler. This optical fiber loop functions as a delay line.

The fraction of the power which is coupled from the first input port of the coupler to the second output port (or from the second input port to the first output port) is referred to as the cross-coupling ratio k. The fraction of the power that passes straight through from the first input port to the first output port (or from the second input port to the second output port) is (1-k). Thus, the cross-coupling ratio k determines how optical power arriving via one of the input ports is distributed to the two output ports.

Consider an input pulse arriving at the coupler via the optical fiber link and the first input port. A fraction (1-k) of the pulse power passes straight through to the first output port and a fraction k of the pulse power enters the recirculation path via the second output port. This latter fraction recirculates via the fiber loop delay line and reenters the coupler via the second input port wherein a fraction is returned to the main fiber link via the first output port and a fraction is recirculated again. This process repeats so that the net effect is that a pulse propagating on the optical fiber link and entering the coupler via the first input port is broadened when it leaves the coupler at the first output port to resume propagating via the optical fiber link. The extent of the pulse broadening sets an upper limit on the bit rate that can be transmitted by the fiber link. In particular, the longer the fiber delay line, the greater the pulse broadening and the lower the limit on the maximum bit rate.

More analytically, the operation of the BRL may be understood by considering its transfer function. In particular, the transfer function has a zero at $f_o = \frac{1}{2}\tau$ where $\tau$ is the delay of the optical fiber loop. This means that only signals having a bit rate below $f_o$ pass undistorted through the BRL, thereby establishing a bit rate limit for the optical fiber link.

The above-described BRL device provides a simple and effective method of bit rate limitation, but it imposes the identical bit rate limitation on all the signals passing through the optical fiber link. Optical fiber links have a very high inherent bandwidth capacity so that they are frequently used to simultaneously carry several wavelength channels. Typically, some of these channels may be used for low bit-rate applications, and others for high bit-rate applications, such as high-definition digital video.

It would be useful to have a device for achieving an individual bandwidth limitation for each individual channel of a multi-channel optical fiber link. Accordingly, it is an object of the present invention to provide a device for affecting a desired bit rate limitation for each of the channels in a multi-channel optical fiber communications link.

SUMMARY OF THE INVENTION

The present invention is a device which can individually limit the bit rate of each of a plurality of wavelength channels propagating in an optical fiber communications link.

The bit rate limiter device of the present invention comprises a four-port (i.e. two input ports and two output ports) directional coupler. Like the prior art device described above, the coupler is inserted into a fiber optic link via the first input port and first output port. In a recirculation path extending between the second output port and second input port is a wavelength division demultiplexer (WDDM). Thus, the fraction of optical power directed by the coupler to the second output port is demultiplexed into a plurality of individual wavelength channels $\lambda_1, \lambda_2 \ldots \lambda_N$. Each individual wavelength channel is fed from the WDDM to a separate optical fiber loop. These loops serve as delay lines for the individual wavelength channels. The outputs of the delay lines are connected to a wavelength division multiplexer (WDM) which combines the optical power leaving the delays lines for reinsertion into the coupler via the second input port. In this manner, each wavelength channel undergoes a different amount of pulse broadening determined by its own delay line, so that each wavelength channel is provided with a different maximum bit rate. Alternatively, the device may be viewed as providing each wavelength channel with its own transfer function having its own value $f_o$ at which no power is transmitted.

In an alternative embodiment of the invention, each of the wavelength channels exiting the wavelength division demultiplexer is fed to a separate optical switch. By application of suitable remotely generated control voltages, these optical switches can be maintained in a transparent state or a blocking state. The switches corresponding to selected wavelength channels whose maximum bit rate is to be limited are set to their transparent state, permitting optical power at the selected wavelengths to pass to a fiber loop which serves as a delay line. Optical power exiting the delay line is returned to the coupler via the second input port to provide pulse broadening and bit rate limitation for the selected wavelength channels. Wavelength channels that are not to be bandwidth limited are blocked by their respective switches which are set to the blocking state. These wavelengths are not delayed in the recirculation path and undergo no pulse broadening. Thus, by controlling the state of the optical switches, pulse broadening and bit rate limitation may be selectively achieved for some of the wavelength channels but not for others.

DETAILED DESCRIPTION

Figure 1:
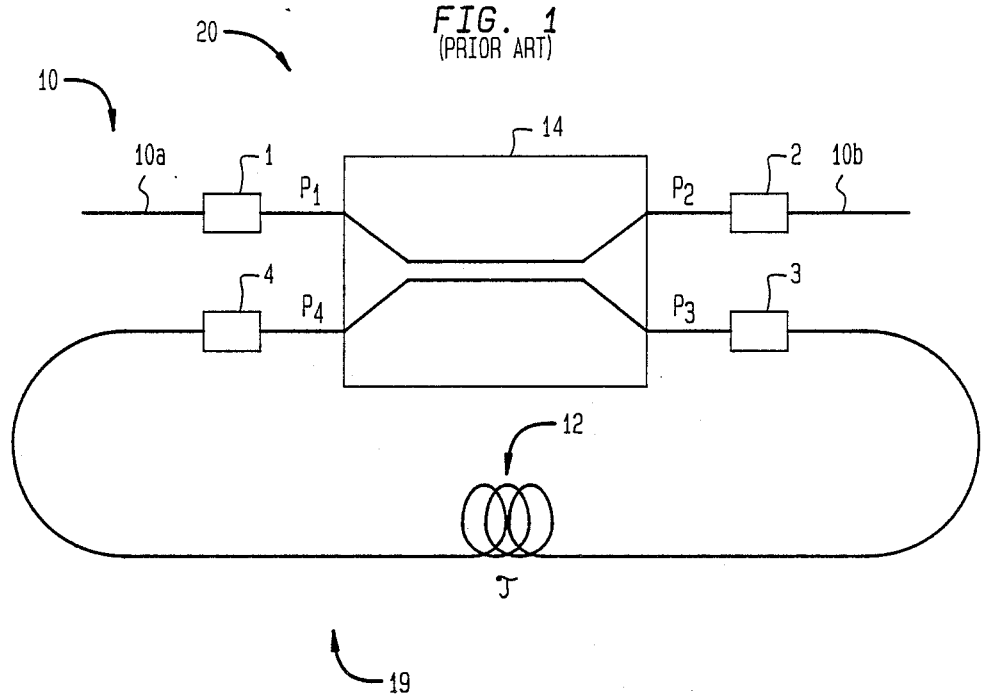
FIG. 1 shows a prior art bit-rate limiter device.

FIG. 1 illustrates a prior art bit rate limiter device 20. The device 20 comprises a directional coupler 14 having two input ports designated 1 and 4 and two output ports designated 2 and 3. The ports 1, 2, 3, 4 are illustratively formed using fiber connectors.

The device 20 is inserted into an optical fiber link 10 whose bit rate is to be limited. The fiber link 10 comprises portions 10a and 10b. As shown in FIG. 1, portion 10a of the fiber link 10 is connected to the input port 1 and portion 10b of the fiber link 10 is connected to the output port 2 of the coupler 14. An optical fiber loop 12 is connected between the output port 3 and the input port 4 to form a recirculation path 19. The fiber loop 12 serves as a delay $\tau$.

Optical power $P_1$ entering the directional coupler from the fiber link 10 via the input port 1 is divided between the two output ports 2, 3. The fraction of incident power which is cross-coupled from input port 1 to the output port (i.e. $P_1 \rightarrow P_3$) is referred to as the coupling ratio k. The fraction of power which is coupled straight through from input port 1 to output port 2 (i.e. $P_1 \rightarrow P_2$) is (l-k). Similarly, the fraction of incident power which is cross-coupled from input port 4 to output port 2 (i.e. $P_4 \rightarrow P_2$) is k and the fraction of power which couples straight through from input port 4 to output port 3 (i.e. $P_3 \rightarrow P_4$ is (l-k).

Consider an optical input pulse arriving at the coupler 14 via the fiber link 10 and the input port 1. A portion (l-k) of the power in this pulse passes straight through to the output port 2 and a portion k is cross-coupled to the output port 3 and the recirculation path 19. The power directed to output port 3 propagates through the fiber loop delay line 12 and reenters the coupler via the input port 4 wherein a fraction k of this recirculating power is cross-coupled to the output port 2 and a fraction (l-k) passes straight through to the output port 3. This process repeats itself so that the net effect is that a pulse arriving via fiber link portion 10a and input port 1 is broadened at the output port 2 and on fiber link portion 10b.

This pulse broadening limits the maximum bit rate on fiber link 10. The longer the delay $\tau$ of the fiber loop 12, the greater the amount of pulse broadening and the lower the maximum bit rate. This pulse broadening may be understood as follows. The directional coupler may be viewed as providing two propagation paths, a first propagation path which extends straight through the coupler from input port 1 to output port 2 and a second propagation path which includes the recirculation path 19. The coupler divides the incoming power between the two propagation paths. The fraction of the power directed to the second propagation path is delayed relative to the fraction of power directed to the first propagation path. When the two fractions are recombined at the output port 2 pulse broadening results.

Figure 2:
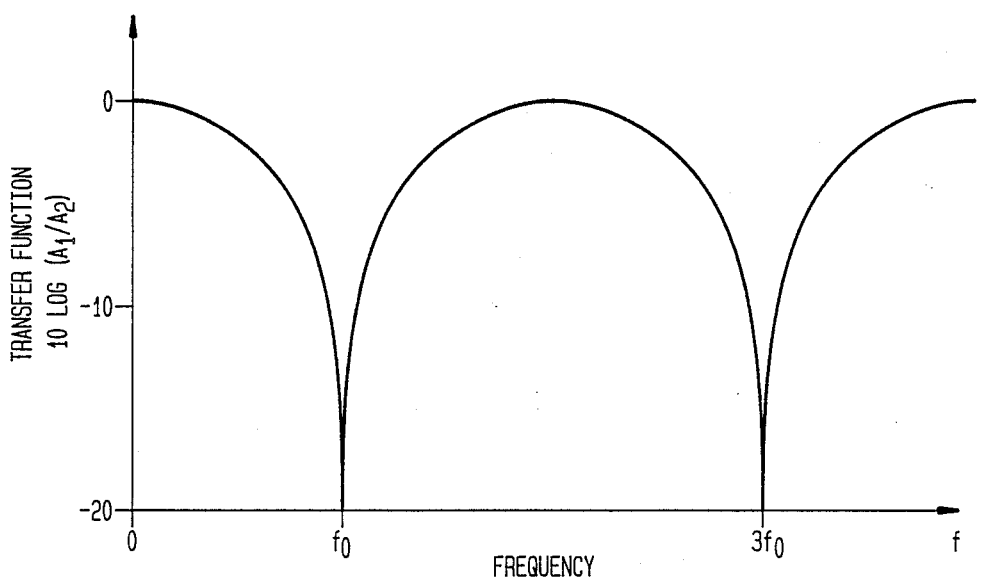
FIG. 2 shows the transfer function of the bit rate limiter of FIG. 1.

Analytically, the bit rate limiting device 20 may be more clearly understood by considering its transfer function as shown in FIG. 2. To obtain the transfer function of FIG. 2, a sinusoidally modulated optical signal of amplitude $A_1$ and frequency f is applied to the input port 1. The amplitude of the output signal at port 2 is $A_2$. FIG. 2 plots the ratio $A_2/A_1$ in decibels as a function of frequency f. At the frequency $f=f_o=\frac{1}{2}\tau$ (where $\tau$ is the delay provided by fiber loop 12) no power is transmitted by the device. Similarly, no power is transmitted at the frequency $f=3f_o$. Thus, the transfer function of FIG. 2 shows that signals of low frequency spectral content (e.g. digitally modulated optical signals having a bit rate below $f_o$) are transmitted unaffected by the device 14. On the other hand, signals of high frequency spectral content (e.g. digitally modulated optical signals having a bit rate above $f_o$) signals are substantially affected by the device 20. Thus, the frequency $f_o$ serves as an approximate upper bound on the bit rate of signals which can be transmitted unaffected through the device 20.

Figure 3:
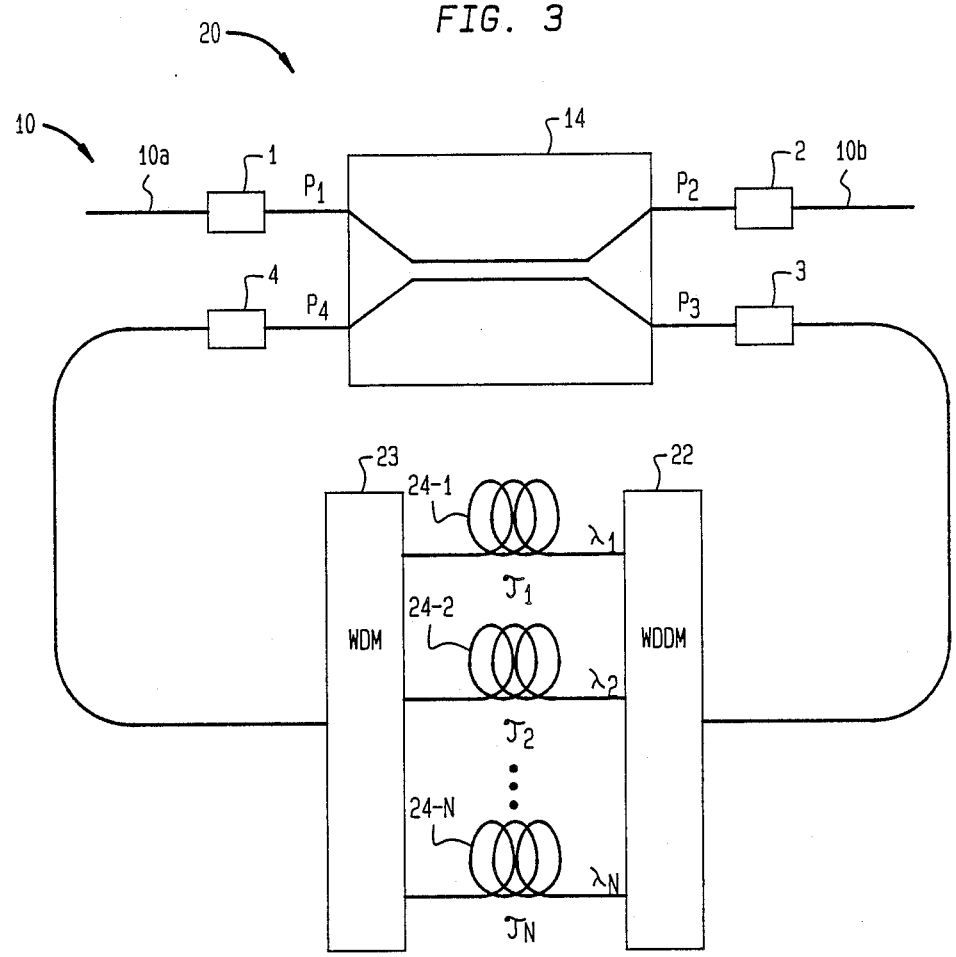
FIG. 3 shows a multi-channel bit-rate limiter device in accordance with an illustrative embodiment of the present invention.

Turning to FIG. 3, a device 30 which provides individual bit rate limitation for each of a plurality of wavelength channels is illustrated. In particular, in FIG. 3, the fiber loop 12 of FIG. 1 is replaced by the wavelength division demultiplexer (WDDM) 22, a plurality of channel specific delays $\tau_1, \tau_2 \ldots \tau_N$, and the wavelength division multiplexer (WDM) 23.

IN FIG. 3, the fiber link 10 is assumed to be carrying a plurality of individual wavelength channels. A fraction k of the input signal power at input port 1 is cross-coupled to the output port 3. This power is transmitted to the WDDM device 22 and is demultiplexed into the individual wavelength channels $\lambda_1, \lambda_2 \ldots \lambda_N$. Each of the individual wavelength channels is directed to an individual optical fiber loop 24-1, 24-2 . . . 24-N which provide the characteristic delays $\tau_1, \tau_2 \ldots \tau_N$. The power exiting the optical fiber loops 24-1, 24-2 . . . 24-N is multiplexed using the WDM device 23 and returned to the coupler 14 via the input port 4. A fraction k of this recirculated power is cross-coupled to the output port 2 and a fraction (l-k) couples straight through to the output port 3. The net effect is pulse broadening at the output port 2, such that each individual wavelength channel $\lambda_1, \lambda_2 \ldots \lambda_N$ experiences a different amount of pulse broadening depending on its individual delay $\tau_1, \tau_2 \ldots \tau_N$. Thus, each wavelength channel is bit rate limited by a different amount.

Alternatively, the individual delays $\tau_1, \tau_2 \ldots \tau_N$ may be viewed as providing each individual wavelength channel with an individual transfer function having a different value $f_o$ and thus a different maximum bit rate.

Figure 4:
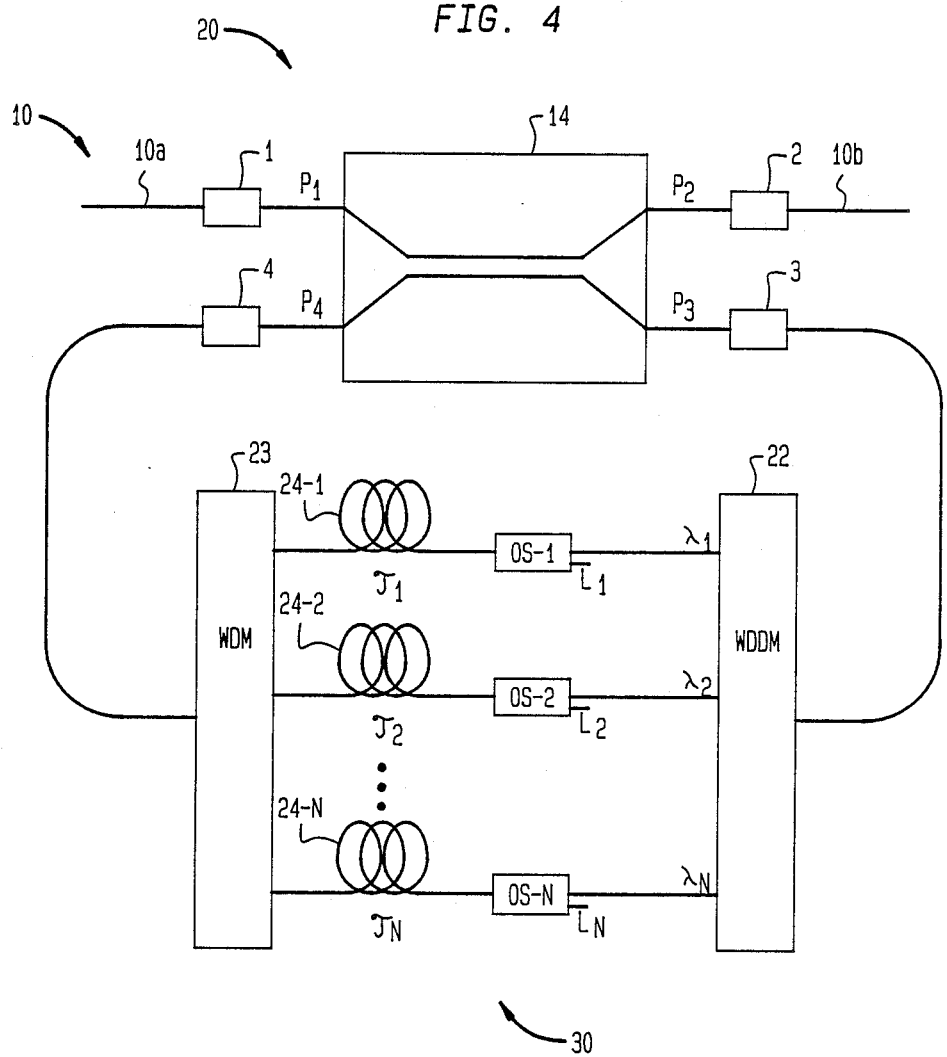
FIG. 4 shows an alternative embodiment of the present invention, in which each of the channels shown in FIG. 3 is equipped with an optical switch, to affect or suppress bit-rate limitation.

In the embodiment of the invention shown in FIG. 4 an optical switch OS-1, OS-2, ... OS-N for each wavelength channel $\lambda_1, \lambda_2 \ldots \lambda_N$ is inserted between the WDDM 22 and the corresponding fiber loop 24-1, 24-2 ... 24-N. Illustratively, the optical switches OS-1, OS-2 ... OS-N are liquid crystal switches and may be maintained in a transparent or blocking state through the application of remotely generated control voltages applied via leads L1, L2 ... LN.

In the embodiment of the invention shown in FIG. 4, selected wavelength channels may be bit rate limited while other wavelength channels are not bit rate limited. For those selected wavelength channels to be bit rate limited, the corresponding optical switches are set to the transparent state. This provides optical power from the selected wavelength channels with access to the fiber loops 24 which form part of the recirculation path 30 extending between the output port 3 and the input port 4. Thus, the selected wavelength channels experience pulse broadening and bit rate limitation by an amount determined by the individual fiber loop delay elements 24. Those wavelengths which are not to be bit rate limited have their optical switches set to the blocking state so that the recirculation path 30 is blocking for them. These wavelengths undergo no pulse broadening and no bit rate limitation.

Figure 5:
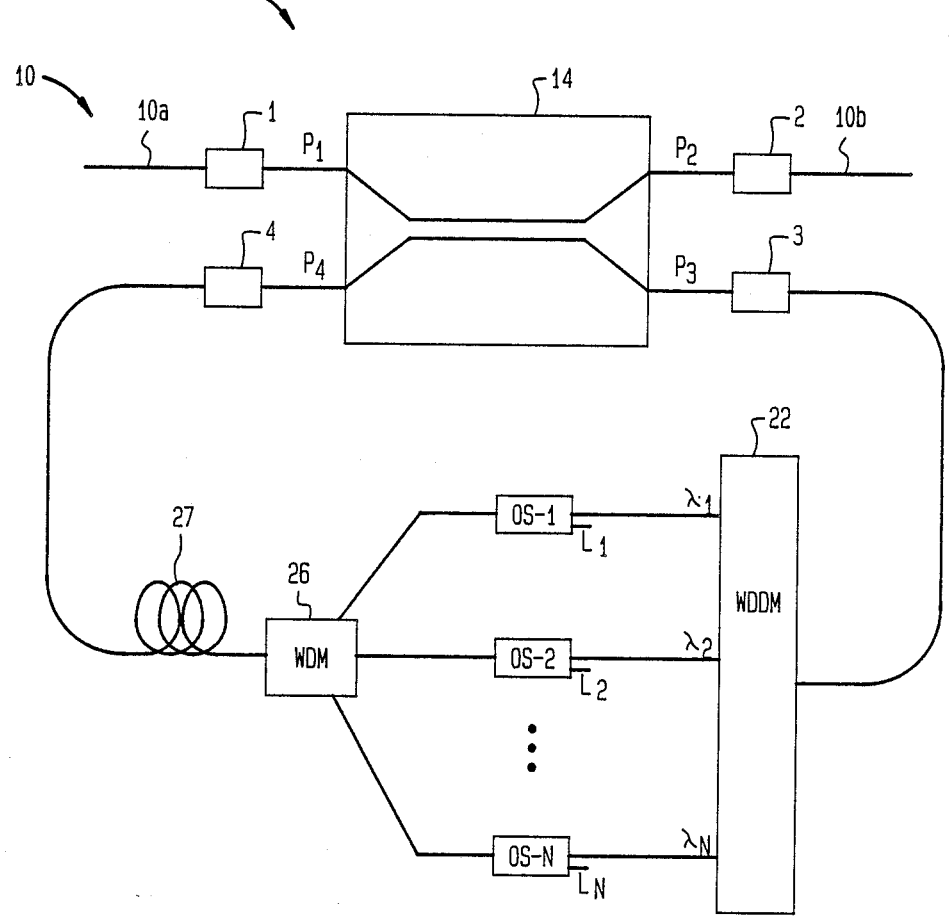
FIG. 5 shows an alternative embodiment of the present invention, in which channels that are to be similarly bit-rate limited share a single delay element.

While in the embodiment of the invention shown in FIG. 4, the selected wavelength channels are bit rate limited by individual amounts, in FIG. 5, selected wavelength channels are all bit rate limited by the same amount. In other words a wavelength channel is either bit rate limited by a certain amount or not bit rate limited at all.

More particularly, in the device of FIG. 5, multiwavelength optical power arriving at the input port 1 and cross coupled to output port 3 is transmitted to wavelength division demultiplexer 22. Depending on the state (transparent or blocking) of the optical switches OS-1, OS-2 ... OS-N some of the wavelengths are transmitted to the wavelength division multiplexer device 26 and some of the wavelengths are blocked. The transmitted wavelengths are multiplexed by the multiplexer device 26 and transmitted through the fiber loop 27 which serves as a common delay element for all the transmitted wavelengths. The power leaving the fiber loop 27 is returned to the coupler 14 via input port 3. Thus, those wavelength channels transmitted by the switches OS-1 ... OS-N experience pulse broadening and bit rate limitation in an amount determined by the common delay element 27. Those wavelengths blocked by the switches OS-1, OS-2 ... OS-N experience no pulse broadening and no bit rate limitation.

Finally, a number of embodiments of a device for achieving individual bit rate limitations for the individual wavelength channels propagating in an optical fiber have been disclosed. These embodiments of the invention are intended to be illustrative only. Numerous alternative embodiments may be devised by persons skilled in this art, without departing from the spirit and scope of the following claims.

What is claimed is:

1. A device for affecting an individual bit rate limitation for each of a plurality of wavelength channels propagating in an optical fiber link, said device comprising:
    a directional coupler inserted into said optical fiber link, and
    a recirculation path extending between an output of said coupler and an input of said coupler, said coupler serving to direct a fraction of the power propagating in said optical fiber link to said recirculation path,
    said recirculation path including a wavelength division multiplexing means for the purpose of separating said fraction of said power into said plurality of wavelength channels and a plurality of delay elements for delaying each of said wavelength channels in said recirculation path by an individual amount.

2. A device for affecting bit rate limitations for a plurality of individual wavelength channels propagating in an optical fiber link, said device comprising
    a directional coupler inserted into said optical fiber link,
    a recirculation path extending between an output of said coupler and an input of said coupler, said coupler serving to direct a fraction of the power propagating in said optical fiber link to said recirculation path,
    said recirculation path including wavelength division multiplexing means for the purpose of separating said fraction of said power into said plurality of wavelength channels, optical delay means, and switch means located between said demultiplexing means and said delay means for selectively transmitting selected ones of said channels to said delay means,
    whereby wavelength channels transmitted by said switch means for bit rate limited and wavelength channels not transmitted by said switch means are not bit rate limited.

3. The device of claim 2 wherein said delay means comprises a single delay so that all bit rate wavelengths are limited by the same bit rate amount.

4. The device of claim 2 wherein said delay means comprises an individual delay means for each wavelength channel so that those bit rate wavelength channels are each limited by an individual bit rate amount.

5. A device for affecting bit rate limitations for a plurality of individual wavelength channels propagating in an optical fiber link, said device comprising
    a directional coupler inserted into said optical fiber link,
    a recirculation path extending between an output of said coupler and an input of said coupler, said coupler serving to direct a fraction of the optical power propagating in said optical fiber link to said recirculation path,
    said recirculation path including:
    wavelength division multiplexing means connected to said output of said coupler,
    a plurality of optical delay elements havingdifferent delay values, and
    switch means for connecting individual wavelength channels outputted by said multiplexing means to different ones of said delay elements so that individual ones of said wavelength channels may be bit rate limited by different amounts.

6. A device for affecting an individual bit rate limitation for each of a plurality of individual wavelength channels propagating in an optical fiber lin, said device comprising
    first and second propagation paths, means associated with said optical fiber link for dividing the optical power propagating in said fiber link between said first and second propagation paths, means located in said second propagation path for separating optical radiation propagating in said second propagation path into said individual wavelength channels, and a plurality of delay elements located in said second propagation path for providing each of said wavelength channels with an individual delay relative to said first propagation path, so that each of said individual wavelength channels is bit rate limited by a different amount.

7. The device of claim 6 wherein said dividing means is a directional coupler, said first propagation path extends straight through said directional coupler, and said second propagation path includes a recirculation path extending between an output of said coupler and an input of said coupler, said recirculation path including an individual delay element for each of said wavelength channels.

8. A device for affecting bit rate limitations for a plurality of wavelength channels propagating in an optical fiber link, said device comprising first and second propagation paths, said second propagation path providing a delay for optical power propagating therein relative to said first propagation path, means associated with the optical fiber link for dividing the optical power propagating therein between the first and second propagation paths, and optical switch means for selectively enabling particular ones of said wavelength channels to propagate in said second propagation path.

9. The device of claim 8 wherein said dividing means is a directional coupler, said first propagation path extends straight through said directional coupler, and said second propagation path includes a recirculation path extending between an output of said coupler and an input of said coupler, said recirculation path including means for providing said delay and switch means for directing optical power belonging to particular wavelength channels to said means for providing said delay.

10. The device of claim 8 wherein said second propagation path provides different delays for different ones of said wavelength channels.

* * * * *

UNITED STATES PATENT AND TRADEMARK OFFICE
CERTIFICATE OF CORRECTION

PATENT NO. : 4,890,893

DATED : January 2, 1990

INVENTOR(S) : Lanny S. Smoot

It is certified that error appears in the above-identified patent and that said Letters Patent is hereby corrected as shown below:

Column 1, line 17, "line'" should read --lines'--.
Column 3, line 50, "port" should read --port 3--.
Column 6, line 57, "havingdifferent" should read --having different--;
        line 66, "lin," should read --link,--.

Signed and Sealed this

Eleventh Day of May, 1993

Attest:

MICHAEL K. KIRK

Attesting Officer    Acting Commissioner of Patents and Trademarks